(12) United States Patent
Lukacs et al.

(10) Patent No.: US 11,060,937 B2
(45) Date of Patent: Jul. 13, 2021

(54) MICROMECHANICAL PRESSURE SENSOR (71) Applicant: Robert Bosch GmbH, Stuttgart (DE)

(72) Inventors: Ferenc Lukacs, Lenti (HU); Arne Dannenberg, Metzingen (DE); Friedjof Heuck, Stuttgart (DE); Helmut Grutzeck, Kusterdingen (DE); Mike Schwarz, Kusterdingen (DE); Robert Maul, Reutlingen (DE); Tamas Dögei, Nagykata (HU); Thomas Friedrich, Moessingen-Oeschingen (DE); Volkmar Senz, Metzingen (DE)

(73) Assignee: Robert Bosch GmbH, Stuttgart (DE)

( * ) Notice: Subject to any disclaimer, the term of this patent is extended or adjusted under 35 U.S.C. 154(b) by 139 days.

(21) Appl. No.: 16/488,470

(22) PCT Filed: Feb. 21, 2018

(86) PCT No.: PCT/EP2018/054200
§ 371 (c)(1),
(2) Date: Aug. 23, 2019

(87) PCT Pub. No.: WO2018/158116
PCT Pub. Date: Sep. 7, 2018

(65) Prior Publication Data
US 2019/0376864 A1 Dec. 12, 2019

(30) Foreign Application Priority Data
Mar. 2, 2017 (DE) .......................... 102017203384.3

(51) Int. Cl.
*G01L 19/14* (2006.01)
*G01L 19/06* (2006.01)
(Continued)

(52) U.S. Cl.
CPC .......... *G01L 19/146* (2013.01); *G01L 9/0052* (2013.01); *G01L 19/0069* (2013.01); *G01L 19/0618* (2013.01)

(58) Field of Classification Search
CPC ............... G01L 9/00–08; G01L 9/0052; G01L 19/00–06; G01L 19/0069; G01L 19/0618; G01L 19/14; G01L 19/146
See application file for complete search history.

(56) References Cited

U.S. PATENT DOCUMENTS

| 9,975,756 B2 * | 5/2018 | Duqi | G01L 19/146 |
| 10,611,628 B2 * | 4/2020 | Lee | B81B 7/0016 |

(Continued)

FOREIGN PATENT DOCUMENTS

| CN | 102089638 A | 6/2011 | |
| CN | 103674355 A * | 3/2014 | G01L 1/18 |

(Continued)

OTHER PUBLICATIONS

International Search Report for PCT/EP2017/054200, dated May 29, 2018.

*Primary Examiner* — Nguyen Q. Ha
(74) *Attorney, Agent, or Firm* — Norton Rose Fulbright US LLP; Gerard Messina (57) ABSTRACT

A micromechanical pressure sensor, having—a pressure sensor core including a sensor diaphragm and a cavity developed above the sensor diaphragm; and—a pressure sensor frame; and—a spring element for the mechanical connection of the pressure sensor core to the pressure sensor frame being developed in such a way that a mechanical robustness is maximized and a coupling of stress from the pressure sensor frame into the sensor pressure core is minimized.

9 Claims, 6 Drawing Sheets (51) Int. Cl.
*G01L 9/06* (2006.01)
*G01L 9/00* (2006.01)
*G01L 19/00* (2006.01)

(56) References Cited

U.S. PATENT DOCUMENTS

| | | | |
|---|---|---|---|
| 2001/0001550 A1 | 5/2001 | Bryzek et al. | |
| 2011/0057236 A1* | 3/2011 | Feyh | G01P 15/124 |
| | | | 257/254 |
| 2011/0154905 A1 | 6/2011 | Hsu et al. | |
| 2012/0060605 A1 | 3/2012 | Wu et al. | |
| 2014/0217521 A1 | 8/2014 | Johari-Galle et al. | |
| 2016/0061677 A1 | 3/2016 | Han et al. | |
| 2016/0273985 A1* | 9/2016 | Lee | G01L 9/0054 |
| 2017/0176278 A1* | 6/2017 | Chen | G01L 9/0054 |
| 2017/0369306 A1* | 12/2017 | Bieselt | G01L 9/0054 |
| 2018/0003503 A1* | 1/2018 | Haubold | G01L 19/146 |
| 2018/0024020 A1* | 1/2018 | Stefanescu | G01L 19/145 |
| | | | 73/721 |
| 2018/0209863 A1* | 7/2018 | Golly | G01L 9/0042 |

FOREIGN PATENT DOCUMENTS

| | | | | |
|---|---|---|---|---|
| CN | 103674355 A | | 3/2014 | |
| CN | 205120297 U | * | 3/2016 | G01L 9/00 |
| CN | 205120297 U | | 3/2016 | |
| DE | 19825298 A1 | | 12/1999 | |
| DE | 102009029217 A1 | | 3/2011 | |
| DE | 102015116353 A1 | | 5/2016 | |
| JP | 2013246121 A | | 12/2013 | |

* cited by examiner

MICROMECHANICAL PRESSURE SENSOR

FIELD OF THE INVENTION

The present invention relates to a micromechanical pressure sensor. In addition, the present invention relates to a method for producing a micromechanical pressure sensor.

BACKGROUND INFORMATION

Modern packaging techniques require a mechanical decoupling of the pressure-sensitive portion of a pressure sensor in the form of a pressure sensor diaphragm from the rest of the substrate, using special spring designs, thereby making it independent of packaging influences (assembly and joining technology), for instance in the way it is realized in the sensor LPS22HB by STMicroelectronics. External influences that subject the pressure sensor to mechanical stress (e.g., bending), for example, are mechanical tensions due to a molding process, a development that uses multiple materials having different thermal coefficients of expansion, stress caused by solder joints of the packaged sensor mounted on an external circuit board, and others.

A micromechanical pressure sensor in which a pressure differential is measured as a function of a deformation of a sensor diaphragm is known from the document German Published Patent Application No. 10 2004 006 197, for example.

SUMMARY

It is an object of the present invention to provide an improved pressure sensor, in particular a pressure sensor which shows robustness with regard to stresses.

According to a first aspect, the objective is achieved by a micromechanical pressure sensor, which includes:
  A pressure sensor core featuring a sensor diaphragm and a cavity which is developed above the sensor diaphragm; and
  a pressure sensor frame;
  a spring element for the mechanical connection of the pressure sensor core to the pressure sensor frame, which is developed in such a way that a mechanical robustness is maximized and the coupling of stresses from the pressure sensor frame into the pressure sensor core is minimized.

This provides an optimized connection of the pressure sensor core to the pressure sensor frame, in which sufficient stability is realized during an external acceleration (e.g. by improper dropping of the pressure sensor) together with a robustness of the pressure sensor in response to mechanical stress from the environment (e.g., in the form of bending of the pressure sensor frame). The mentioned mechanical stress from the environment is advantageously able to be kept away from the pressure sensor diaphragm, thereby facilitating an optimized operating behavior of the micromechanical pressure sensor. This provides a micromechanical pressure sensor which features a pressure sensor diaphragm that is exposed on all sides and has an optimized connection of the pressure sensor core, so that an efficient stress-decoupling structure is realized.

According to a second aspect, the objective is achieved by a method for producing a micromechanical pressure sensor, the method having the following steps:
  Providing a pressure sensor core with a sensor diaphragm and a cavity developed above the sensor diaphragm; and
  providing a pressure sensor frame, in which
  a spring element for the mechanical connection of the pressure sensor core to the pressure sensor frame is developed so that a mechanical robustness is maximized and the coupling of stress from the pressure sensor frame to the pressure sensor core is minimized.

According to one advantageous further development of the micromechanical pressure sensor, the pressure sensor core is connected to the pressure sensor frame by a cantilever-type spring element. This makes it possible to provide an excellent mechanical decoupling of the pressure sensor core from the pressure sensor frame. This is useful, for instance, for micromechanical pressure sensors that are normally not able to drop to the floor such as in the case of permanently installed pressure sensors in the automotive field. In an advantageous manner, no coupling of a static moment is able to occur in the case of such sensors.

According to another advantageous further development of the present method, the spring element is connected to the pressure sensor core with the aid of a connection element, the spring element being developed in the form of a ring around the pressure sensor core, and the spring element being connected to the pressure sensor frame with the aid of a further connection element. Lower mechanical stresses may thereby be coupled in if the pressure sensor hits the ground. In this variant, too, no static moment may advantageously be coupled into the pressure sensor core.

Another advantageous further development of the micromechanical pressure sensor is characterized in that the pressure sensor core is connected to the spring element by two symmetrically disposed connection elements, the spring element being connected to the pressure sensor frame by a further connection element. This specific embodiment advantageously promotes an excellent mechanical decoupling and a compact design.

According to another advantageous further development of the micromechanical pressure sensor, the spring element is connected to the pressure sensor core by a connection element, the spring element being connected to the pressure sensor frame with the aid of two symmetrically disposed connection elements. A further improved mechanical decoupling is provided in this case.

Another advantageous further development of the micromechanical pressure sensor is characterized in that the pressure sensor core is connected to the spring element by two connection elements, the spring element being developed in the form of a ring around the pressure sensor core, and the spring element being connected to the pressure sensor frame by two connection elements. This provides a mechanically robust variant of a micromechanical pressure sensor, which has a symmetrical development, thereby uniformly distributing the stress decoupling in an advantageous manner.

Another advantageous further development of the micromechanical pressure sensor is characterized in that the spring element is connected to the pressure sensor core with the aid of four symmetrically disposed connection elements, the spring element being connected to the pressure sensor frame by two symmetrically disposed connection elements. In this variant, the stress decoupling is advantageously shifted to the edge of the pressure sensor core. This may further assist in an even better stress-decoupling of piezoelectric resistors.

Another advantageous further development of the micromechanical pressure sensor is characterized in that the spring element is connected to the pressure sensor core with the aid of two connection elements situated at diagonals of the pressure sensor core. This specific embodiment is similar to the previously mentioned embodiment, but an even greater elasticity in the xy plane is provided in this case.

According to another advantageous further development of the micromechanical pressure sensor, electrical lines for the piezoresistive elements are routed on the spring elements, a Wheatstone bridge circuit being realized in the process. This facilitates an electrical line routing for the pressure sensor core in which the space is optimized.

Another advantageous further development of the micromechanical pressure sensor is characterized in that the spring element is connected to the pressure sensor core with the aid of four connection elements which are disposed at the corner points of the pressure sensor core. In this way, the suspension of the pressure sensor core is able to be realized at a great distance from the piezo resistors, which are better protected as a result.

According to another advantageous further development of the micromechanical pressure sensor, the connection elements are developed in such a way that they provide an optimum in terms of robustness and mechanical stress decoupling between the pressure sensor core and the pressure sensor frame. This ensures an optimum between mechanical robustness and the decoupling of mechanical stress.

In the following text, the present invention will be described in detail together with further features and advantages with the aid of a plurality of figures. Identical or functionally equivalent elements have been provided with matching reference numerals. The figures are specifically intended to illustrate the principles that are essential to the present invention and have not necessarily been drawn true to scale. For better clarity, it may be the case that not all reference numerals have been entered in all of the figures.

Disclosed method features analogously result from correspondingly disclosed device features, and vice versa. This particularly means that features, technical advantages and embodiments pertaining to the method for producing a micromechanical pressure sensor analogously result from corresponding embodiments, features and technical advantages of the micromechanical pressure sensor, and vice versa.

DETAILED DESCRIPTION

A core idea of the present invention particularly is to provide an improved, especially a robust, micromechanical pressure sensor which offers excellent stress decoupling.

Figure 1:
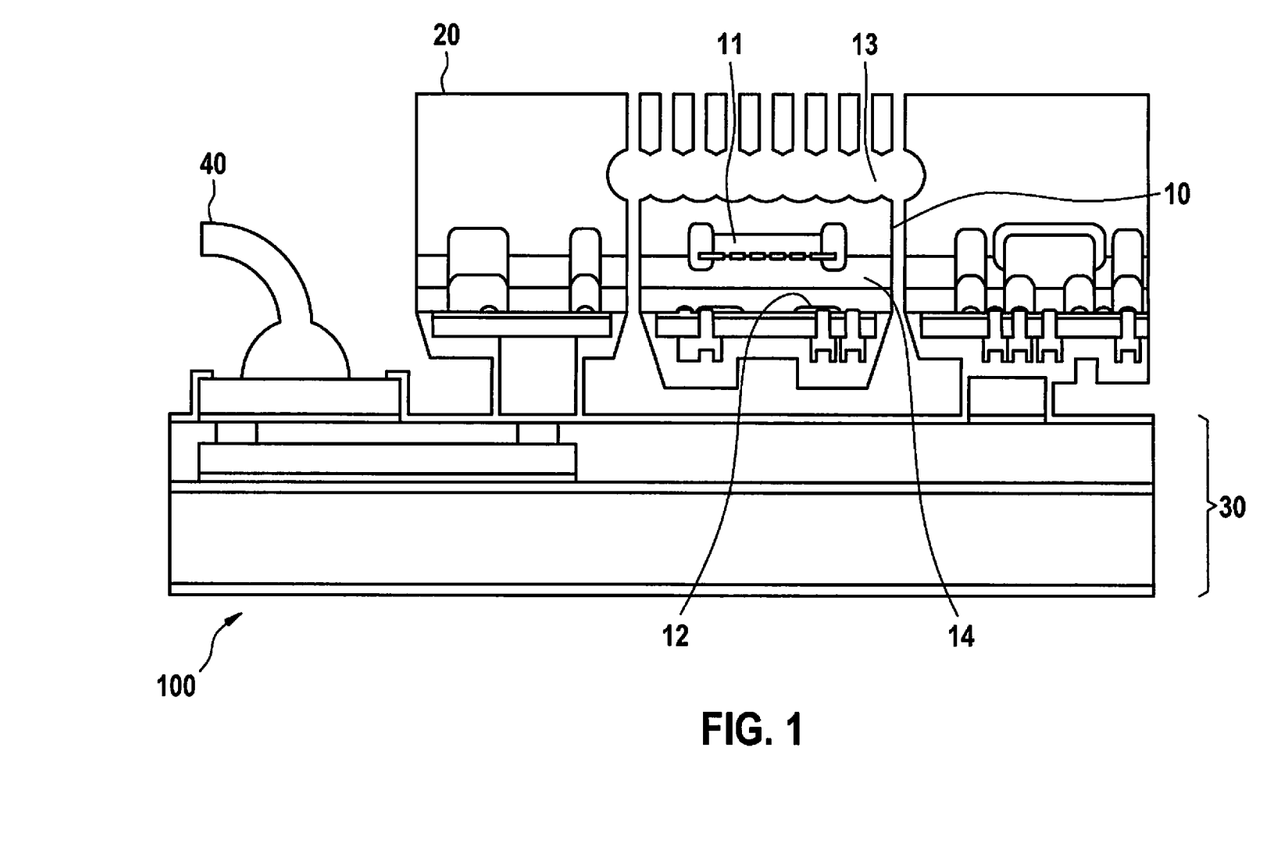
FIG. 1 shows a cross-sectional view of a micromechanical pressure sensor.

FIG. 1 shows a cross-sectional view of a basic structure of a provided micromechanical pressure sensor 100. The pressure-sensitive part of pressure sensor 100, hereinafter denoted as "pressure-sensor island" or "pressure sensor core" 10, includes a sensor diaphragm 14 having a size of approx. 500 µm×approx. 500 µm, a cavity 11 (vacuum-reference cavity), and a circumferential mechanical stabilization (not shown). All mentioned elements are situated in a further cavity 13, this cavity 13 being limited by ASIC 30 on the one side (underneath pressure sensor core 10), and by a rear-side grid on the other side (above pressure sensor core 10).

Through external mechanical excitations (e.g., during a drop and an impact between pressure sensor 100 and the floor), pressure sensor core 10 can be very strongly accelerated and the stabilizing springs (not shown) be greatly deflected and possibly destroyed in the process. For this reason, it is necessary to use relatively thick spring elements and a great distance from the rear-side grid. The maximum mechanical stresses on the springs are relatively high in the event of a strong deflection. In addition, it should be avoided that the pressure sensor core strikes the ASIC because such striking or contact may lead to tears in the passivations and thus to a failure of the component.

External influences that subject the pressure sensor to mechanical stress (such as bending), among others, are mechanical twisting due to a molding process, and/or a development which uses a material mixture that features different thermal coefficients of expansion, and/or stress by solder joints of the packaged sensor on an external customer circuit board, for example.

To the extent that these bending influences reach the pressure sensor core, they result in a faulty pressure signal.

Therefore, it is provided to configure the mentioned springs in such a way that they mechanically decouple pressure sensor core 10 from the remaining portion of pressure sensor 100 and that they are able to absorb the large mechanical stresses during accelerations.

FIG. 1 shows a cross-sectional view of such a micromechanical pressure sensor 100, which is developed as a piezoresistive pressure sensor. A pressure sensor frame 20 and a pressure sensor core 10 can be seen, pressure sensor core 10 being electrically and mechanically coupled to pressure sensor frame 20 in the aforementioned manner. Pressure sensor core 10 includes a sensor diaphragm 14 in which piezoresistive elements 12 for detecting a deformation of sensor diaphragm 14 are developed. A cavity 11 (vacuum reference cavity) is developed above sensor diaphragm 14 of pressure sensor core 10. Pressure sensor core 10 is situated within cavity 13 in the aforementioned manner. Pressure sensor frame 20 is coupled to an ASIC 30, which is electrically contacted toward the outside via bond elements 40.

Figure 2:
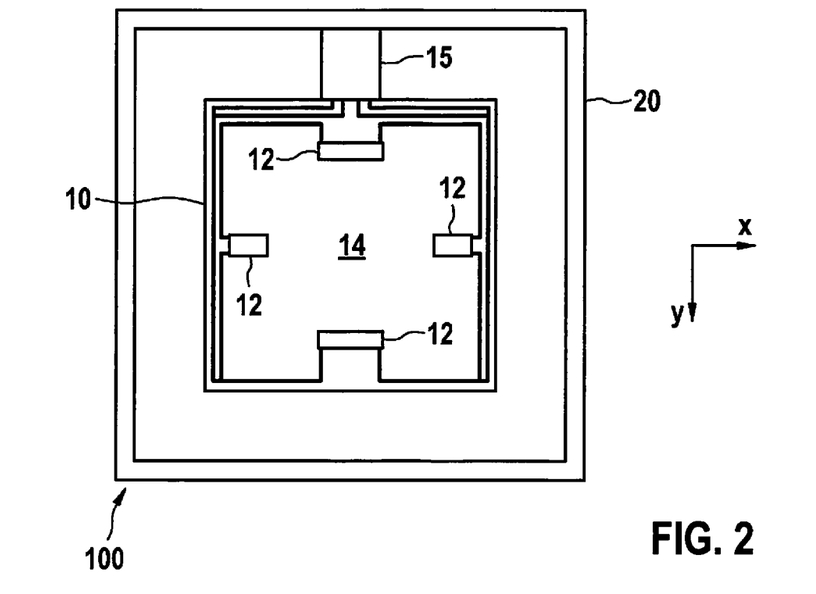
FIGS. 2 through 10 show cross-sectional views with specific embodiments of the micromechanical pressure sensor.

FIG. 2 shows a plan view of pressure sensor core 10 together with sensor diaphragm 14 of pressure sensor core 10. It may be gathered that pressure sensor core 10 is connected to pressure sensor frame 20 by a single, cantilever-type spring element 15. This singular connection advantageously helps to ensure that only minimal mechanical stress is coupled from pressure sensor frame 20 into pressure sensor core 10. A geometrical dimension of spring element 15 is such that an optimization is provided in terms of mechanical stability and stress decoupling. A width of spring element 15 amounts to approx. 10 µm to approx. 50 µm.

A single connection element or a single suspension point is thereby provided on pressure sensor core 10 and on pressure sensor frame 20. The connection element, too, is geometrically developed so that it provides an optimization in terms of mechanical stability and stress decoupling. It is developed with the smallest possible mechanical contact cross-section, which maximizes the robustness and also minimizes the mechanical stress coupling, that is to say, maximizes a stress decoupling.

It has become apparent that this is best achievable using a geometrical dimension of the connection elements of approx. 50 µm to approx. 100 µm. The mentioned geometrical parameters are preferably ascertained by arithmetic simulation methods. By suspending pressure sensor core 10 at a single point, no mechanical moment is able to be coupled into pressure sensor core 10, similar to the operation of a cantilever. Since the spring is secured in place at only a single point on mechanical pressure sensor frame 20, it can also not be subjected to a static moment.

In the accelerated case in the vertical z-direction, the suspension point is not exposed to a moment in the x-direction since pressure sensor core 10 is symmetrically suspended in the x-direction. In other words, spring element 15 will not rotate about an imaginary line through the diaphragm center, parallel to the y-axis.

The system of FIG. 2 thus ultimately realizes a very stiff connection of pressure sensor core 10 to the mechanical land of pressure sensor frame 20.

Figure 3:
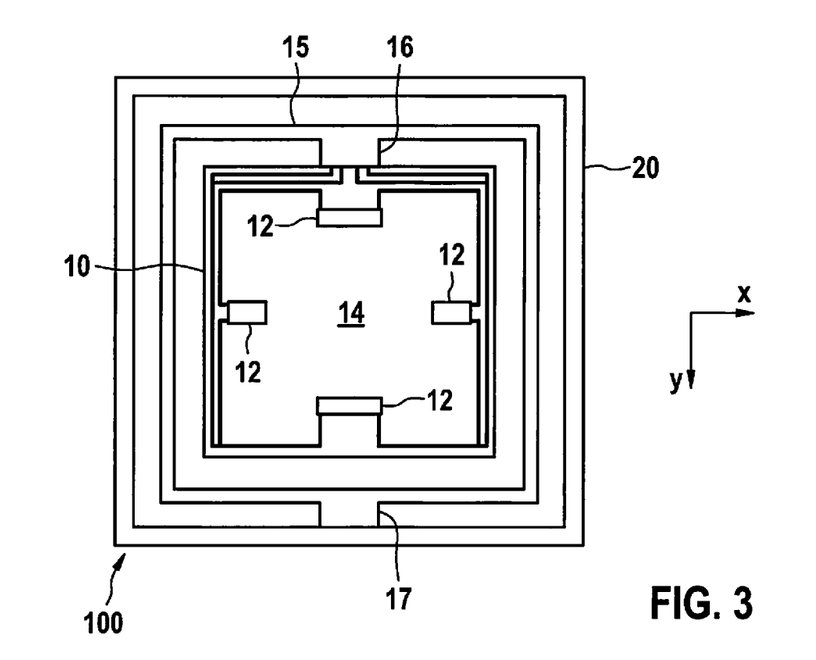

In order to slightly reduce this high stiffness, spring element 15, as shown in the system of FIG. 3, may be developed in the form of a ring around pressure sensor core 10. However, both connection elements 16, 17 are thereby subjected to a moment in the y-direction because pressure sensor core 10 is asymmetrically suspended in the y-direction. In other words, spring element 15 is rotated about an imaginary line through the center of the diaphragm, parallel to the x-axis.

In a first approximation, a thickness of the suspension (i.e. an extension out of the plane) is of importance for the mechanical stability of the suspension in the y-direction. In relation to a width of the suspension (extension in the x-direction), pressure sensor core 10 has a relatively thick development.

Figure 4:
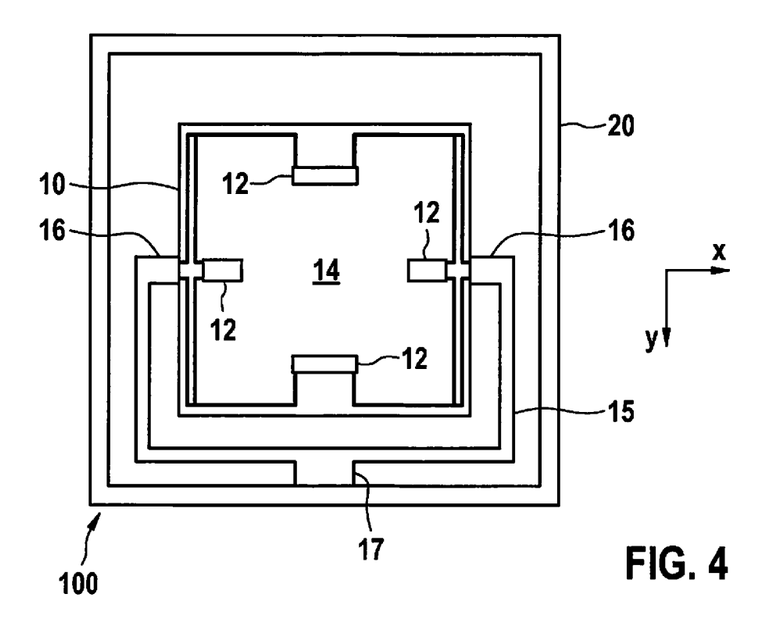

FIG. 4 shows a further embodiment of micromechanical pressure sensor 100 featuring a specific development of spring element 15. This type of spring element 15 advantageously realizes a stress decoupling through a suspension at a single connection element 17 of pressure sensor frame 20. In this way, pressure sensor core 10 is essentially not exposed to a static moment resulting from twisting of mechanical land of pressure sensor frame 20.

In addition, this type of suspension offers the advantage that it symmetrically engages with pressure sensor core 10. In the acceleration case, the engagement moments on pressure sensor core 10 are reduced, which advantageously reduces the mechanical stresses. This type of spring routing also saves space in an advantageous manner since no circling of the entire pressure sensor core 10 is necessary.

Figure 5:
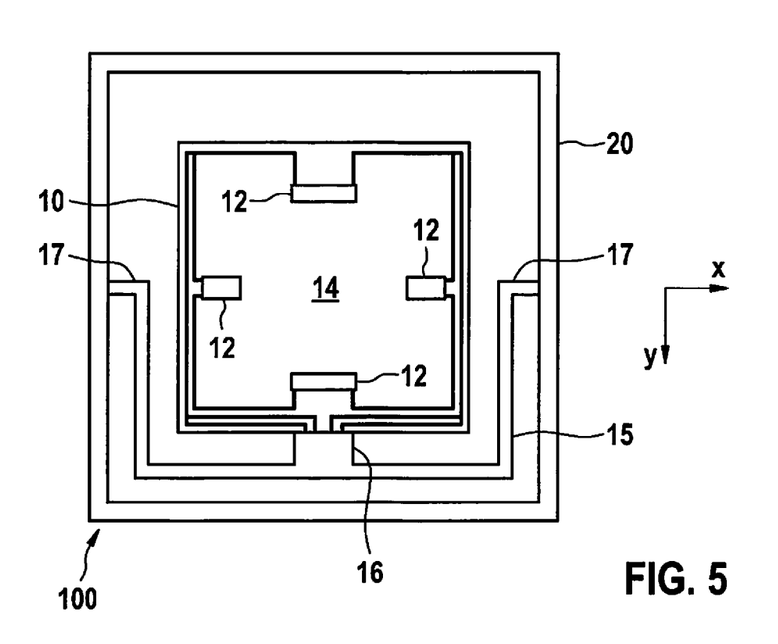

The arrangement of spring element 15 in micromechanical pressure sensor 100 in FIG. 5 is similar to that of FIG. 4 as far as the basic development is concerned. One difference is that pressure sensor core 10 is connected to spring element 15 at only a single connection element 16. In comparison with the specific embodiment of FIG. 4, connection elements 17 at pressure sensor frame 20 are thereby advantageously able to be reinforced by individual, more surface-intensive designs. It may advantageously be exploited in this context that the design surface on pressure sensor frame 20 is subject to fewer restrictions than the design surface on pressure sensor core 10.

Due to the asymmetrical suspension of pressure sensor core 10 realized in this way, a high moment may be exerted on pressure sensor core 10 in the vertical z-direction in the heavily accelerated case, so that this variant may preferably be used for permanently installed micromechanical pressure sensors 100 (e.g., in the automotive field).

Figure 6:
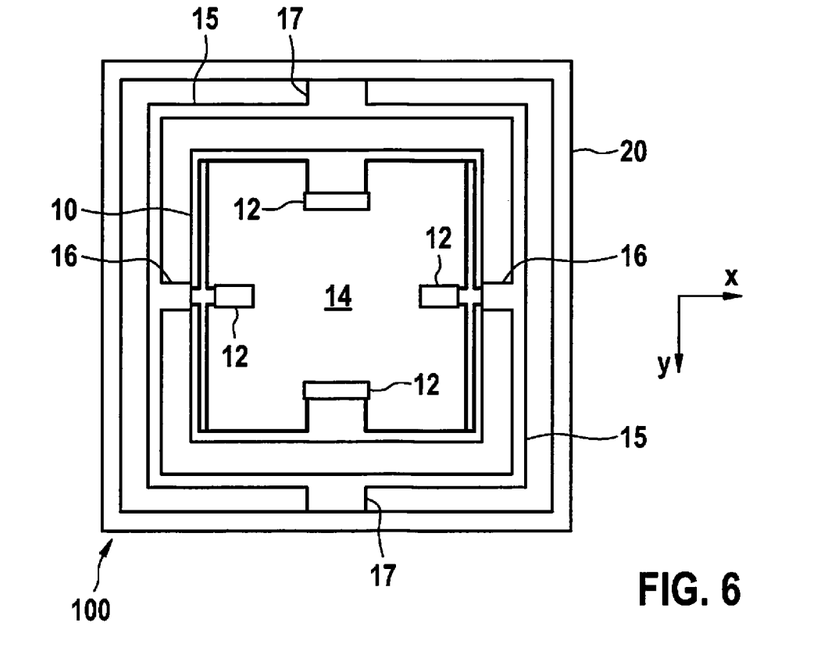

The specific embodiment of micromechanical pressure sensor 100 of FIG. 6 having a symmetrical design offers the special advantage that in a first approximation, bending of pressure sensor core 10 is reduced in proportion to a relationship between a width of pressure sensor core 10 and a width of connection element 17. For this purpose, spring element 15 has such a soft development that it does not couple a torque into pressure sensor core 10, if possible. This is due to the fact that in contrast to a merely one-sided coupling, this configuration is unable to couple external static mechanical twisting of pressure sensor frame 20 into pressure sensor core 10 quite as well. In an advantageous manner, this arrangement is fully symmetrical, and occurring mechanical tensions are therefore more uniform and fewer in the dynamic case.

Figure 7:
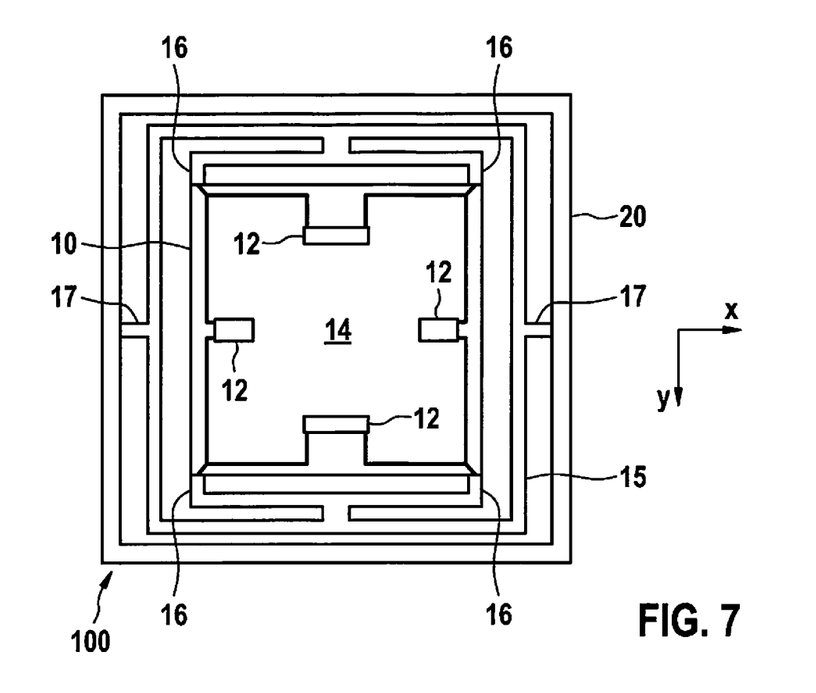

The configuration of the specific embodiment of FIG. 7 is a further development of the specific embodiment of FIG. 6. Piezoresistive elements 12 (e.g., in the form of piezoresistive resistors) of pressure sensor core 10 are electrically interconnected to form a Wheatstone bridge in order to maximize the sensor signal. Piezoresistive elements 12 detect any type of mechanical stress. To ensure that the mechanical stress introduction of the parasitic electrical supply lines is minimal, it is provided that the electrical contactings of the Wheatstone bridge are realized at the four corners of pressure sensor core 10. To allow for the most compact development of the spring design together with the electrical wiring, the return line to the center of pressure sensor core 10 is able to be implemented on a separate spring.

Figure 8:
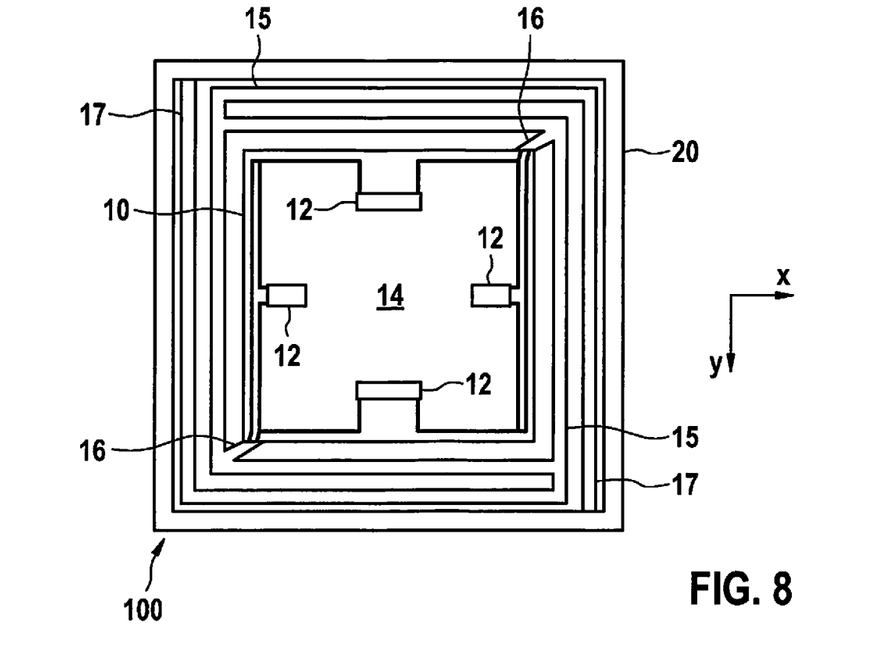

The specific embodiment of micromechanical pressure sensor 100 of FIG. 8 is essentially based on the specific embodiment of FIG. 7. If the frame of pressure sensor core 20 is elongated in the x-direction in the specific development of FIG. 7, then the type of spring suspension causes the inner spring frame to be upset in the y-direction, which then leads to an introduction of stress into pressure sensor core 10. This stress is reduced but not completely excluded. In order to further reduce this stress transmission path, the springs in the specific embodiment of FIG. 8 couple diagonally from the connection on pressure sensor frame 20 into the inner spring frame. As a result, any distortion of pressure sensor frame 20 simply leads to a rotation of pressure sensor core 10 but not to an introduction of stress.

Figure 9:
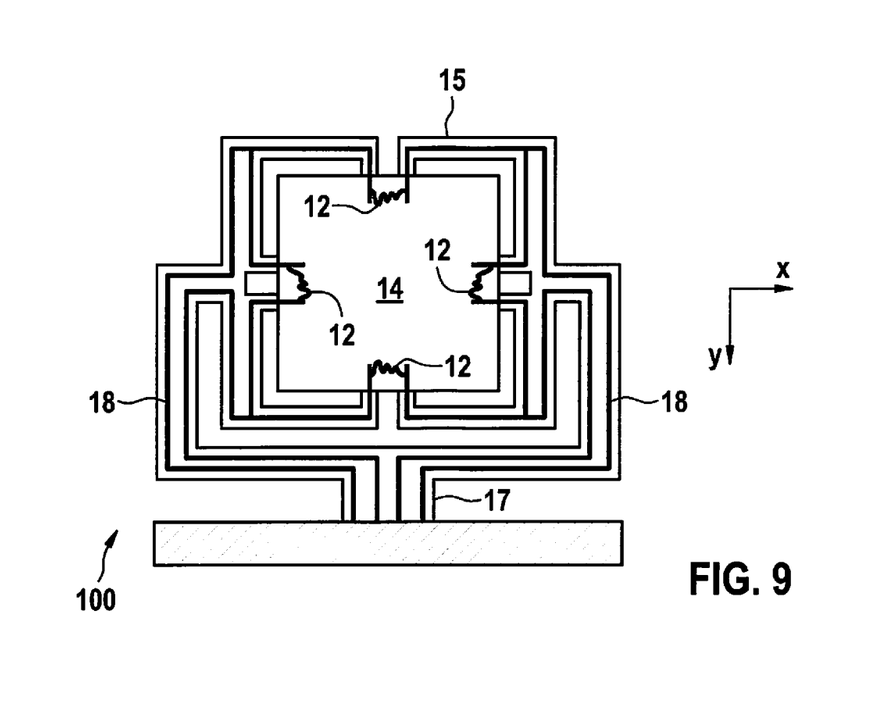

The specific embodiment of FIG. 9 optimizes the required space for the electrical wiring demands together with the advantages of the mechanical decoupling of the specific embodiment of FIG. 4. It can be seen that wiring 18 for the Wheatstone bridge circuit is routed on spring elements 15 in this instance, so that an optimal utilization of the spring area is achieved in this manner.

Figure 10:
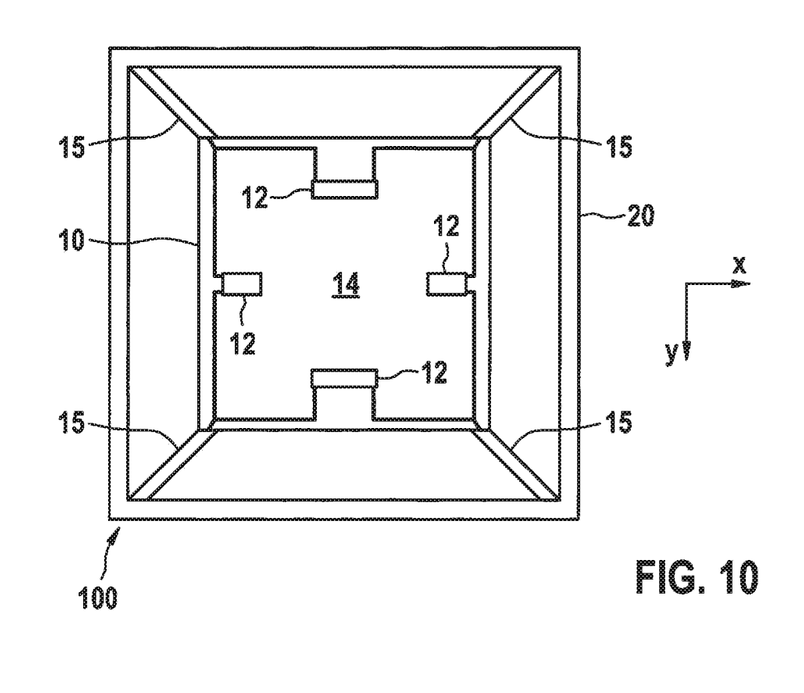

FIG. 10 shows an additional specific embodiment of micromechanical pressure sensor 100, in which spring element 15 engages at pressure sensor core 10 at the greatest possible distance from piezo-resistive elements 12. This makes it possible to reduce the faulty mechanical stress introduction into the pressure measurement.

Figure 11:
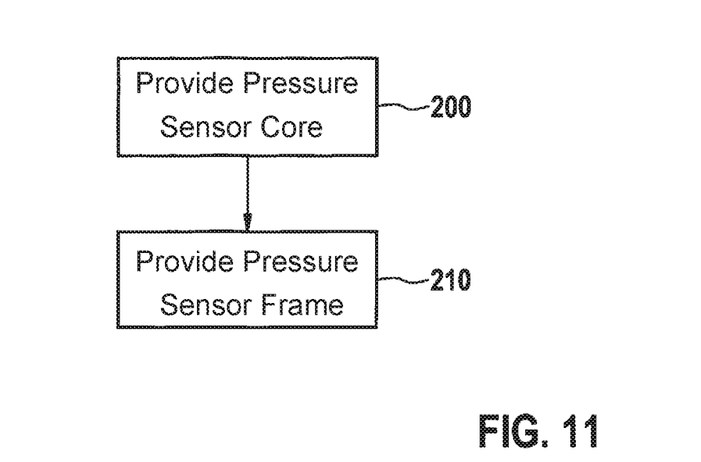
FIG. 11 shows a basic sequence of a specific embodiment of a method for producing a micromechanical pressure sensor.

FIG. 11 shows a basic sequence of a method for producing a micromechanical pressure sensor 100.

In a step 200, a pressure sensor core 10 is provided, which has a sensor diaphragm 14 and a cavity 11 that is developed above sensor diaphragm 14.

In a step 210, a pressure sensor frame 20 is provided, and a spring element 15 for the mechanical connection of pressure sensor core 10 to pressure sensor frame 20 is developed in such a way that a mechanical robustness is maximized and the coupling of stress from pressure sensor frame 20 into pressure sensor core 10 is minimized.

Although the present invention has been described on the basis of a piezoresistive micromechanical pressure sensor in the preceding text, it is also conceivable to develop the micromechanical pressure sensor in a capacitive form.

As a result, one skilled in the art may also realize embodiments of the present invention that have not been disclosed or that have been disclosed only partially in the preceding text, without departing from the core of the present invention.

What is claimed is:

1. A micromechanical pressure sensor, comprising:
a pressure sensor core that includes a sensor diaphragm and a cavity developed above the sensor diaphragm;
a pressure sensor frame; and
a spring element that mechanically connects the pressure sensor core to the pressure sensor frame, wherein the spring element includes a ring disposed around the pressure sensor core, the spring element being connected to the pressure sensor core at only a singular connection location via a first connection element, and the spring element being connected to the pressure sensor frame at only a singular connection location via a second connection element.

2. A micromechanical pressure sensor, comprising:
a pressure sensor core that includes a sensor diaphragm and a cavity developed above the sensor diaphragm;
a pressure sensor frame; and
a spring element that mechanically connects the pressure sensor core to the pressure sensor frame, wherein the spring element is connected to the pressure sensor core at only two connection locations via two symmetrically disposed connection elements, and the spring element is connected to the pressure sensor frame at only a singular connection location via a further connection element.

3. A micromechanical pressure sensor, comprising:
a pressure sensor core that includes a sensor diaphragm and a cavity developed above the sensor diaphragm;
a pressure sensor frame; and
a spring element that mechanically connects the pressure sensor core to the pressure sensor frame, wherein the spring element is connected to the pressure sensor core at only a single connection location via a connection element, and the spring element is connected to the pressure sensor frame at only two connection locations via two symmetrically disposed connection elements.

4. A micromechanical pressure sensor, comprising:
a pressure sensor core that includes a sensor diaphragm and a cavity developed above the sensor diaphragm;
a pressure sensor frame; and
a spring element that mechanically connects the pressure sensor core to the pressure sensor frame, wherein the spring element is connected to the pressure sensor core at only four connection locations via four symmetrically disposed connection elements, and the spring element is connected to the pressure sensor frame at only two connection locations via two symmetrically disposed connection elements.

5. The micromechanical pressure sensor as recited in claim 1, further comprising electrical lines for piezoresistive elements that are routed on the spring element in order to realize a Wheatstone bridge.

6. The micromechanical pressure sensor as recited in claim 2, further comprising electrical lines for piezoresistive elements that are routed on the spring element in order to realize a Wheatstone bridge.

7. The micromechanical pressure sensor as recited in claim 3, further comprising electrical lines for piezoresistive elements that are routed on the spring element in order to realize a Wheatstone bridge.

8. The micromechanical pressure sensor as recited in claim 4, further comprising electrical lines for piezoresistive elements that are routed on the spring element in order to realize a Wheatstone bridge.

9. A method for producing a micromechanical pressure sensor, comprising:
providing a pressure sensor core including a sensor diaphragm and a cavity developed above the sensor diaphragm;
providing a pressure sensor frame;
providing a spring element for a mechanical connection of the pressure sensor core to the pressure sensor frame, wherein the spring element includes a ring disposed around the pressure sensor core, the spring element being connected to the pressure sensor core at only a singular connection location via a first connection element, and the spring element being connected to the pressure sensor frame at only a singular connection location via a second connection element.

* * * * *